US009107161B2

(12) United States Patent
Park et al.

(10) Patent No.: US 9,107,161 B2
(45) Date of Patent: Aug. 11, 2015

(54) METHOD AND APPARATUS FOR COMPENSATING FOR TIMING SYNCHRONIZATION ERROR IN A COMMUNICATION SYSTEM

(75) Inventors: Si-Hyun Park, Hwaseong-si (KR); Hwa-Sun You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 13/505,070

(22) PCT Filed: Oct. 29, 2010

(86) PCT No.: PCT/KR2010/007563
§ 371 (c)(1),
(2), (4) Date: Apr. 30, 2012

(87) PCT Pub. No.: WO2011/053062
PCT Pub. Date: May 5, 2011

(65) Prior Publication Data
US 2012/0218933 A1     Aug. 30, 2012

(30) Foreign Application Priority Data

Oct. 29, 2009     (KR) ........................ 10-2009-0103659

(51) Int. Cl.
*H04H 20/71*     (2008.01)
*H04W 56/00*     (2009.01)

(52) U.S. Cl.
CPC .................................. *H04W 56/005* (2013.01)

(58) Field of Classification Search
CPC ................... H04W 56/0045; H04W 56/0005; H04W 24/10; H04W 72/1268; H04L 7/00–7/10
USPC ............... 370/312, 331, 336, 350; 455/67.14, 455/502, 561
See application file for complete search history.

(56) References Cited

U.S. PATENT DOCUMENTS

| 6,101,176 | A | * | 8/2000 | Honkasalo et al. | 370/335 |
| 2005/0281247 | A1 | * | 12/2005 | Lim et al. | 370/350 |
| 2006/0182063 | A1 | * | 8/2006 | Ma et al. | 370/331 |
| 2007/0021122 | A1 | * | 1/2007 | Lane et al. | 455/441 |
| 2007/0230510 | A1 | * | 10/2007 | You et al. | 370/503 |
| 2008/0064329 | A1 | * | 3/2008 | Jung et al. | 455/18 |
| 2009/0318175 | A1 | * | 12/2009 | Sandberg | 455/502 |

FOREIGN PATENT DOCUMENTS

| KR | 10-2009-0083583 A | 8/2009 |
| WO | 2008/069555 A1 | 6/2008 |
| WO | WO 2008082273 A1 * | 7/2008 |

* cited by examiner

*Primary Examiner* — Jeffrey M Rutkowski
*Assistant Examiner* — Romani Ohri
(74) *Attorney, Agent, or Firm* — Jefferson IP Law, LLP (57) ABSTRACT

A method for performing timing synchronization error compensation by a base station in a communication system, in which if there is a need for timing synchronization error compensation of a user equipment, the base station generates a message related to the timing synchronization error compensation, and broadcasts the generated message to the user equipment. In this manner, the base station can notify the user equipment of the need for timing synchronization error compensation in the communication system.

18 Claims, 6 Drawing Sheets

METHOD AND APPARATUS FOR COMPENSATING FOR TIMING SYNCHRONIZATION ERROR IN A COMMUNICATION SYSTEM

PRIORITY

This application is a National Stage application under 35 U.S.C. §371 of an International application filed on Oct. 29, 2010 and assigned application No. PCT/KR2010/007563, and claims the benefit under 35 U.S.C. §365(b) of a Korean patent application filed in the Korean Industrial Property Office on Oct. 29, 2009 and assigned Serial No. 10-2009-0103659, the entire disclosure of which is hereby incorporated by reference.

BACKGROUND OF THE INVENTION

1. Field of the Invention

The present invention relates generally to a method and apparatus for a communication system. More particularly, the present invention relates to a method and apparatus for compensating for a timing synchronization error in a communication system.

2. Description of the Related Art

Generally, in a communication system, a Base Station (BS) of an indoor picocell has difficulty in accurately setting timing synchronization, compared with a BS of a macrocell. The reason is that while the macro BS sets timing synchronization using a Global Positioning System (GPS), the indoor picocell BS is unlikely to be able to use the GPS and thus has difficulty in setting timing synchronization using the GPS. For example, in a Mobile World Interoperability for Microwave Access (WiMAX) communication system, while timing synchronization accuracy of the macro BS is ±1, timing synchronization accuracy of the indoor picocell BS is ±3.5 µs~±2.5 µs, which is about three times higher than the timing synchronization accuracy of the macro BS in error level. If a timing synchronization error between BSs is represented by θ, a timing difference $\theta_A - \theta_B$ between received signals from two neighbor BSs, i.e., a BS A and a BS B, can be represented by $\theta_{diff}$. For example, if a range of θ is ±3.5 µs, a range of $\theta_{diff}$ becomes ±7.0 µs.

An increase in the timing difference between received BS signals may give rise to various problems. One of the typical problems is that cell scanning performance of a User Equipment (UE) degrades, and another problem is that during Multicast and Broadcast Service (MBS) provision, an error may occur in timing synchronization setting and channel estimation by a UE.

First, reference will be made to FIGS. 1 and 2 to describe the problem that cell scanning performance of a UE degrades due to an increase in timing difference between received BS signals that the UE receives from a neighbor BS and a serving BS.

Figure 1:
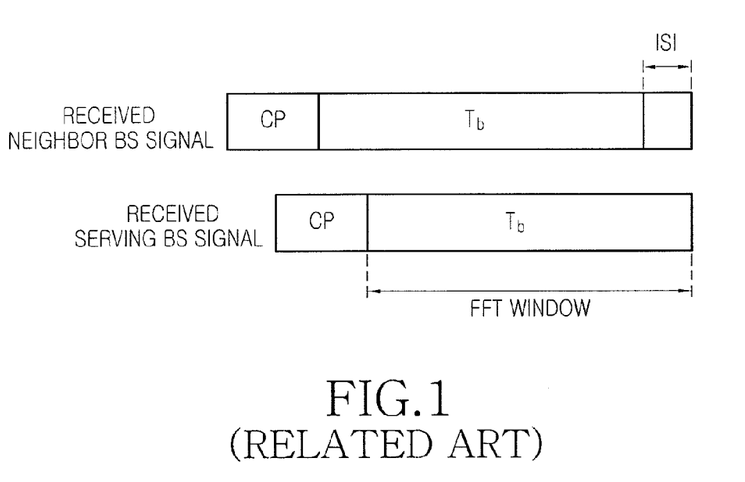
FIG. 1 is a diagram showing a timing difference between received Base Station (BS) signals in communication system according to the related art.

FIG. 1 shows a timing difference between received BS signals in a communication system according to the related art. In FIG. 1, an example of the communication system is a Mobile WiMAX communication system. FIG. 2 is a diagram showing a Carrier to Interference and Noise Ratio (CINR) estimation performance error caused by Inter Symbol Interference (ISI) in a communication system according to the related art.

Prior to a description of FIG. 1, it is to be noted that a UE determines whether to perform handover by performing a cell scanning operation of estimating a CINR using a preamble transmitted by a neighbor BS and comparing the estimated CINR with a CINR of a preamble transmitted by a serving BS. In the cell scanning operation, the UE sets timing synchronization with the serving BS, and then performs a correlation operation by Fast Fourier Transform (FFT). In this case, if a signal from a BS scanned by the UE is received ahead of a timing point which is set in the UE, ISI may occur as shown in FIG. 1. That is, in FIG. 1, since a received neighbor BS signal is received ahead of the timing point set in the UE, a signal of the next symbols received beginning from the point, at which the preamble signal is terminated, may cause ISI.

Figure 2:
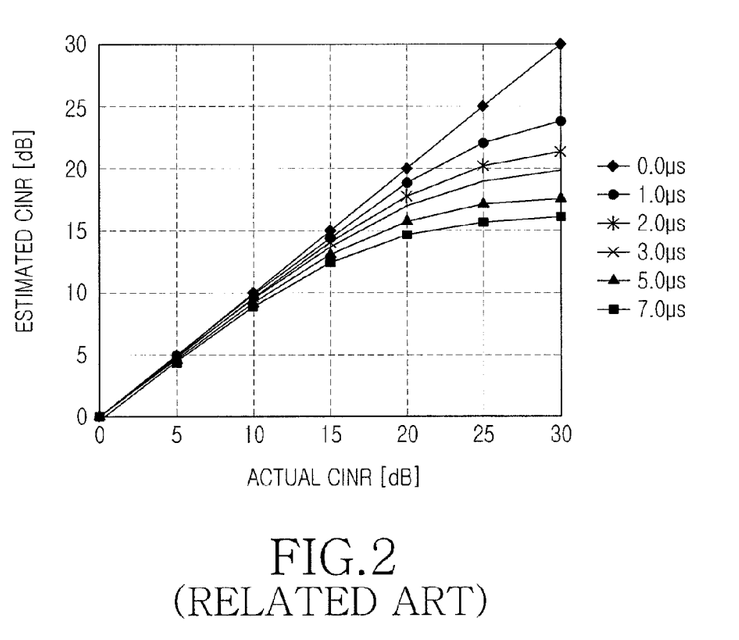
FIG. 2 is a diagram showing a Carrier to Interference and Noise Ratio (CINR) estimation performance error caused by Inter Symbol Interference (ISI) in a communication system according to the related art.

As shown in FIG. 2, the ISI causes a CINR estimation error in a CINR region where the CINR exceeds a predetermined threshold CINR. For example, it is noted in FIG. 2 that if a timing difference $\theta_{diff}$ between received signals from a neighbor BS and a serving BS is 5.0 µs, a CINR floor occurs at 17.9 dB, and if a timing difference $\theta_{diff}$ between received signals from a neighbor BS and a serving BS is 7.0 µs, a CINR floor occurs at 16.3 dB. In particular, when the Mobile WiMAX communication system uses a frequency reuse factor of 3, accurate CINR estimation performance is needed even in a relatively high CINR region of 10 dB or more as handover occurs even in a CINR region where the CINR exceeds a threshold CINR. In this case, the degradation of cell scanning performance may act as a fatal cause of reducing performance of the Mobile WiMAX communication system.

Figure 3:
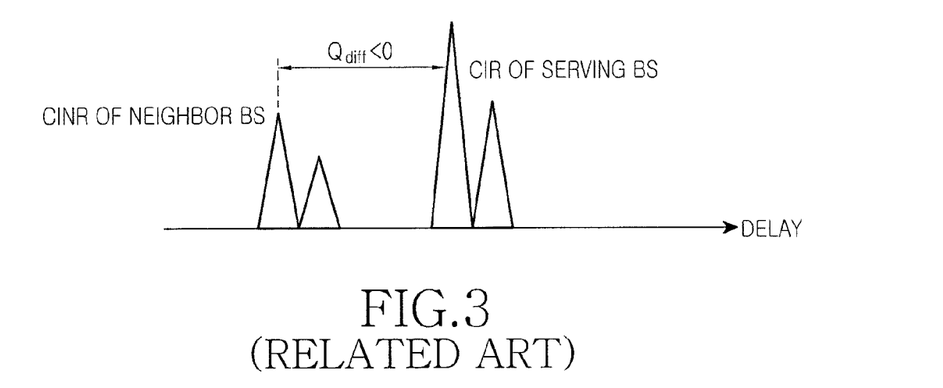
FIG. 3 is a diagram schematically showing the impact of a timing difference between received signals when a User Equipment (UE) receives Multicast and Broadcast Service (MBS) in a communication system according to the related art.

Second, reference will be made to FIG. 3 to describe the problem that during MBS provision, error may occur in timing synchronization setting and channel estimation by a UE. FIG. 3 is a diagram schematically showing the impact of a timing difference between received signals when a UE receives MBS in a communication system according to the related art.

Prior to a description of FIG. 3, it is to be noted that during MBS provision, a UE acquires fine synchronization by re-generating a preamble in a time domain and performing cross-correlation, and sets an FFT window on the basis of a peak path of a serving BS. In this case, if a Channel Impulse Response (CIR) of a serving BS falls behind a CIR of a neighbor BS, i.e., if a timing difference $\theta_{diff}$ between received signals from a neighbor BS and a serving BS is less than 0 ($\theta_{diff} < 0$) as shown in FIG. 3, then ISI may occur as described in FIG. 1. Due to the occurrence of ISI, a needed CINR increases, making it impossible to support a threshold Modulation and Coding Scheme (MCS) level, for example, an MCS level of 64-ary Quadrature Amplitude Modulation (QAM) ½ or more.

Accordingly, there is a need for a plan to compensate for a timing synchronization error to reduce a timing difference between received BS signals.

SUMMARY OF THE INVENTION

Aspects of the present invention are to address at least the above-mentioned problems and/or disadvantages and to provide at least the advantages described below. Accordingly, an aspect of the present invention is to provide a method and apparatus for compensating for a timing synchronization error in a communication system.

Another aspect of the present invention is to provide a timing synchronization error compensation method and apparatus for improving cell scanning performance of a User Equipment (UE) in a communication system.

Still another aspect of the present invention is to provide a timing synchronization error compensation method and apparatus for improving timing synchronization setting and channel estimation performances of a UE during Multicast and Broadcast Service (MBS) provision in a communication system.

In accordance with an aspect of the present invention, a method for performing timing synchronization error compensation by a Base Station (BS) in an indoor communication system is provided. The method includes, if there is a need for timing synchronization error compensation of a UE, the BS generates a message related to the timing synchronization error compensation, and broadcasts the generated message to the UE, wherein the UE is located in a service area of the indoor communication system.

In accordance with another aspect of the present invention, a BS in an indoor communication system in which a UE performs timing synchronization error compensation is provided. The BS includes a controller generates a message related to timing synchronization error compensation if there is a need for the timing synchronization error compensation of the UE, and a transmitter broadcasts the generated message to the UE, wherein the UE is located in a service area of the indoor communication system.

In accordance with still another aspect of the present invention, a method for performing timing synchronization error compensation by a UE in a communication system is provided. The method includes the UE, which receives a message related to timing synchronization error compensation, broadcasted from a BS, and performs the timing synchronization error compensation according to the received message, wherein the UE is located in a service area of the indoor communication system.

In accordance with yet another aspect of the present invention, a UE for performing timing synchronization error compensation in a communication system is provided. The UE includes a receiver which receives a message related to timing synchronization error compensation, broadcasted from a BS, and a controller performs the timing synchronization error compensation according to the received message, wherein the UE is located in a service area of the indoor communication system.

In accordance with still another aspect of the present invention, a method for performing timing synchronization error compensation by a UE in a communication system is provided. The method includes the UE, which receives from a BS a message indicating that a service area of the BS is a timing synchronization error compensation area where timing synchronization error compensation of the UE is needed, determines whether the UE is presently receiving a MBS or performing a cell scanning operation, determines that the timing synchronization error compensation is needed, if the UE is presently receiving an MBS from the BS or performing a cell scanning operation, and performs the timing synchronization error compensation if the timing synchronization error compensation is needed.

In accordance with yet another aspect of the present invention, a method for performing timing synchronization error compensation by a UE in a communication system is provided. The method includes the UE, which receives a message including a timing point shift command from a BS, determines whether the UE is presently receiving a MBS or performing a cell scanning operation, determines that timing synchronization error compensation is needed, if the UE is presently receiving an MBS from the BS or performing a cell scanning operation, and performs the timing synchronization error compensation upon recognizing the need for timing synchronization error compensation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present the present invention include a method and apparatus for compensating for a timing synchronization error in a communication system. In the present disclosure, the communication system is assumed to be a Mobile World Interoperability for Microwave Access (WiMAX) indoor picocell communication system, by way of example. However, the timing synchronization error compensation method and apparatus proposed herein may be used not only in the Mobile WiMAX indoor picocell communication system, but also in other communication systems. In addition, the timing synchronization error compensation method and apparatus proposed herein may be used in other communication systems to which indoor communication systems are applied, which have difficulty in setting timing synchronization using a Global Positioning System (GPS), like the Mobile WiMAX indoor picocell communication system.

First, the indoor picocell communication system may use a surplus Cyclic Prefix (CP) for compensation for a timing synchronization error, since the maximum excess delay of a channel is significantly shorter than a CP. If a length of a CP is represented by $T_{CP}$ and the maximum excess delay spread of a channel is represented as $T_{max\_excess\_delay}$, the surplus CP $T_{CP}-T_{max\_excess\_delay}$ may be used for compensation for a timing synchronization error.

Meanwhile, a timing synchronization error should be compensated so that Inter Symbol Interference (ISI) may not occur even when a received signal timing of a neighbor Base Station (BS) comes ahead of or falls behind a received signal timing of a serving BS. To do so, a User Equipment (UE) may compensate for a timing synchronization error by advancing the currently set timing point by a timing synchronization error compensation value $T_{advance}$, which is defined as, $$T_{advance} = \frac{T_{CP} - T_{max\_access\_delay}}{2} \quad (1)$$

For example, if a length of a CP used in the indoor picocell communication system is 11.43 µs and the maximum excess delay spread of a channel is 0.70 µs, 11.43 µs−0.70 µs=10.73 µs may be used for compensation for a timing synchronization error. The UE may compensate for a timing synchronization error by advancing its timing point by 5.36 µs, i.e. ½ of 10.73 µs, from the currently set timing point in order to prevent ISI from occurring even when a received signal timing of a neighbor BS comes ahead of or falls behind a received signal timing of a serving BS.

Meanwhile, in order for a UE to compensate for a timing synchronization error, a BS should notify of the need for timing synchronization error compensation of the UE, using any one of the following three schemes. For convenience in explanation, an area where compensation for a timing synchronization error of a UE is needed, is referred to as a 'timing synchronization error compensation area'.

In a first scheme, a BS notifies of the presence of the UE in the timing synchronization error compensation area using a separate message such as a Medium Access Control (MAC) message or an application message. That is, the BS notifies of the need for timing synchronization error compensation of the UE by broadcasting a MAC message or an application message including information indicating that a service area of the BS is a timing synchronization error compensation area. For convenience in explanation, the first scheme will be referred to as a 'first notification scheme'.

In a second scheme, the BS transmits a preamble indicating that a service area of the BS is a timing synchronization error compensation area. That is, the BS notifies of the need for timing synchronization error compensation of the UE by transmitting a preamble indicating that a service area of the BS is a timing synchronization error compensation area. For convenience in explanation, the second scheme will be referred to as a 'second notification scheme'.

In a third scheme, the BS commands to shift a timing point of a UE, using a separate message such as a MAC message or an application message. That is, the BS notifies of the need for timing synchronization error compensation of the UE by commanding to shift a timing point of the UE. For convenience in explanation, the third scheme will be referred to as a 'third notification scheme'.

Now, reference will be made to FIG. 4 to describe an internal structure of a BS in an indoor picocell communication system according to an exemplary embodiment of the present invention.

Figure 4:
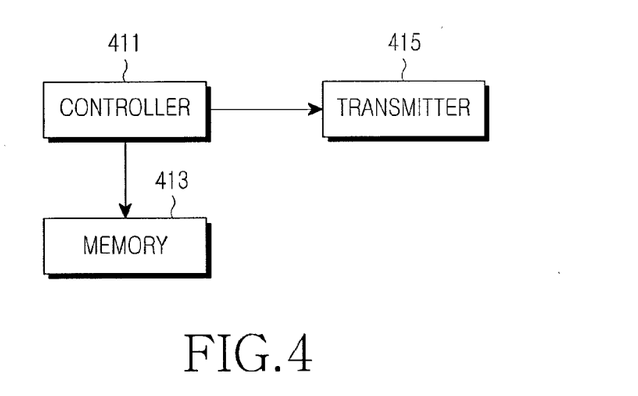
FIG. 4 is a diagram schematically showing an internal structure of a BS in an indoor picocell communication system according to an exemplary embodiment of the present invention.

FIG. 4 schematically shows an internal structure of a BS in an indoor picocell communication system according to an exemplary embodiment of the present invention.

Referring to FIG. 4, the BS includes a controller 411, a memory 413 and a transmitter 415. The controller 411 controls the overall operation of the BS, and operates in any one of the following three schemes according to which of the above-described first to third notification schemes the BS uses to notify of the need for timing synchronization error compensation of a UE.

First, when the BS uses the first notification scheme, the controller 411 is adapted to generate a separate message such as a MAC message or an application message indicating that a service area of the BS is a timing synchronization error compensation area, and broadcast the generated message through the transmitter 415.

Second, when the BS uses the second notification scheme, the controller 411 is adapted to transmit a preamble stored in the memory 413 through the transmitter 415. The preamble indicates that a service area of the BS is a timing synchronization error compensation area.

Third, when the BS uses the third notification scheme, the controller 411 is adapted to generate a separate message such as a MAC message or an application message for commanding to shift a timing point of a UE, and send the generated message through the transmitter 415.

While the controller 411, the memory 413 and the transmitter 415 are shown in separate blocks in FIG. 4, two or more of the controller 411, the memory 413, and the transmitter 415 may be integrated in one block.

Next, reference will be made to FIG. 5 to describe a structure of a UE in an indoor picocell communication system according to an exemplary embodiment of the present invention.

Figure 5:
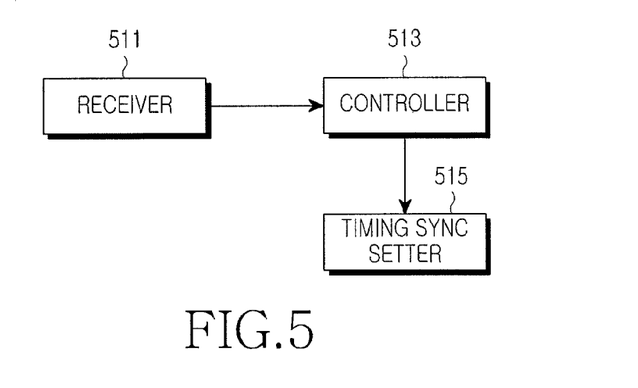
FIG. 5 is a diagram showing a structure of a UE in an indoor picocell communication system according to an exemplary embodiment of the present invention.

FIG. 5 shows a structure of a UE in an indoor picocell communication system according to an exemplary embodiment of the present invention.

Referring to FIG. 5, the UE includes a receiver 511, a controller 513, and a timing synchronization setter 515. The controller 513 controls the overall operation of the UE, and operates in any one of the following three schemes according to which of the above-described first to third notification schemes the BS uses to notify of the need for timing synchronization error compensation of a UE.

First, when the BS uses the first notification scheme, the controller 513 determines whether the UE is presently receiving Multicast and Broadcast Service (MBS) or performing a cell scanning operation, upon recognizing from a MAC message or an application message received through the receiver 511 that a service area of the BS is a timing synchronization error compensation area. If it is determined that the UE is presently receiving MBS or performing a cell scanning operation, the controller 513 controls the timing synchronization setter 515 to set timing synchronization by compensating for a timing synchronization error, upon determining that the timing synchronization error needs to be compensated. The timing synchronization setter 515 sets timing synchronization by compensating for a timing synchronization error by advancing its timing point by a timing synchronization error compensation value $T_{advance}$ as described above.

Second, when the BS uses the second notification scheme, the controller 513 determines whether the UE is presently receiving MBS or performing a cell scanning operation, upon recognizing from a preamble received through the receiver 511 that a service area of the BS is a timing synchronization error compensation area. If it is determined that the UE is presently receiving MBS or performing a cell scanning operation, the controller 513 controls the timing synchronization setter 515 to set timing synchronization by compensating for a timing synchronization error, upon determining that the timing synchronization error needs to be compensated.

Third, when the BS uses the third notification scheme, the controller 513 determines whether the UE is presently receiving MBS or performing a cell scanning operation, upon detecting a timing point shift command from a MAC message or an application message received through the receiver 511. If it is determined that the UE is presently receiving MBS or performing a cell scanning operation, the controller 513 controls the timing synchronization setter 515 to set timing synchronization by compensating for a timing synchronization error, upon determining that the timing synchronization error needs to be compensated.

While the receiver 511, the controller 513, and the timing synchronization setter 515 are shown in separate blocks in FIG. 5, two or more of the receiver 511, the controller 513, and the timing synchronization setter 515 may be integrated in one block.

ISI may be cancelled if the UE compensates for a timing synchronization error as described in conjunction with FIG. 5, and a description thereof will be made with reference to FIG. 6.

Figure 6:
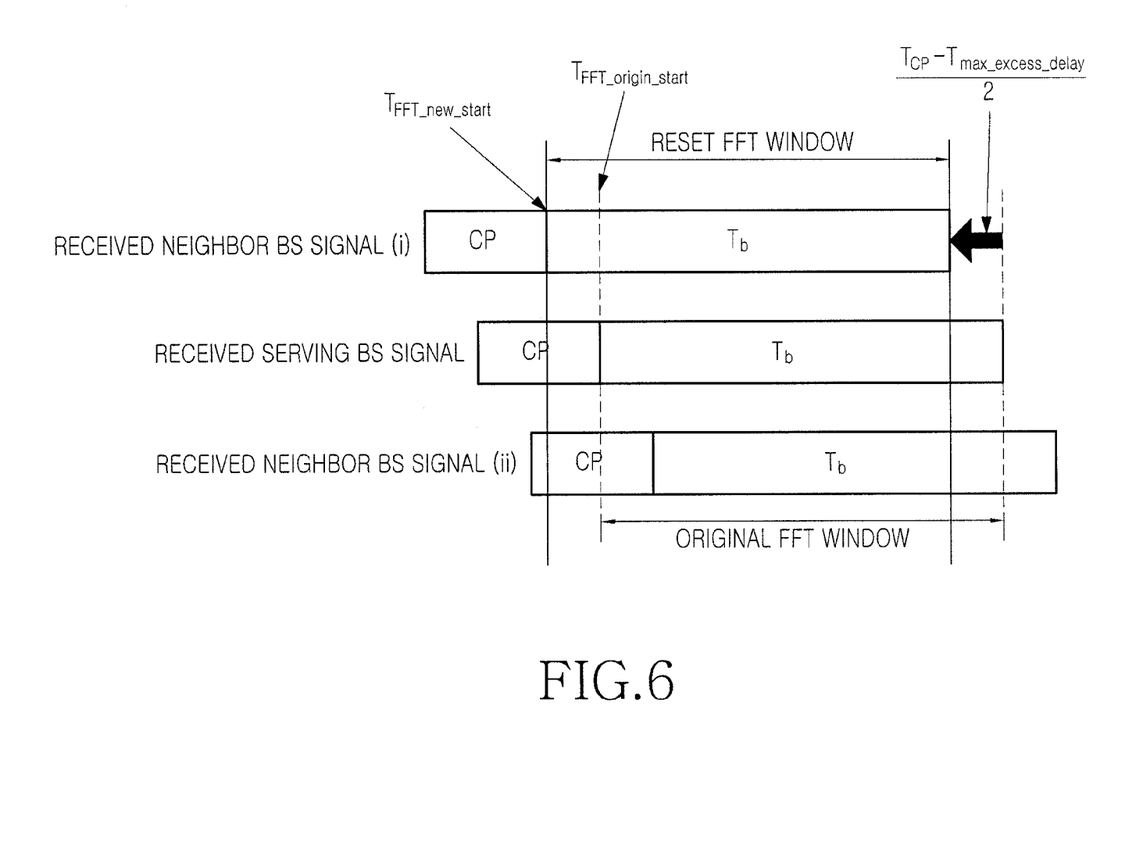
FIG. 6 is a diagram schematically showing a relationship between received BS signals when a UE compensates for a timing synchronization error in an indoor picocell communication system according to an exemplary embodiment of the present invention.

FIG. 6 schematically shows a relationship between received BS signals when a UE compensates for a timing synchronization error in an indoor picocell communication system according to an exemplary embodiment of the present invention.

Referring to FIG. 6, $T_{FFT\_origin\_start}$ represents a timing point set before the UE compensates for a timing synchronization error, and $T_{FFT\_new\_start}$ represents a timing point set after the UE compensated the timing synchronization error. That is, $T_{FFT\_new\_start}$ represents a timing point having undergone timing synchronization error compensation by advancing $T_{FFT\_origin\_start}$ by a timing synchronization error compensation value $T_{advance}$. If the timing point of the UE is set to $T_{FFT\_new\_start}$, ISI may be cancelled by compensating for a timing synchronization error when at least one of (i) a received neighbor BS signal arrives in advance of a received serving BS signal and (ii) a received neighbor BS signal arrives following a received serving BS signal.

Next, reference will be made to FIG. 7 to describe a process of compensating for a timing synchronization error by a UE when a BS uses a first notification scheme in an indoor picocell communication system according to an exemplary embodiment of the present invention.

Figure 7:
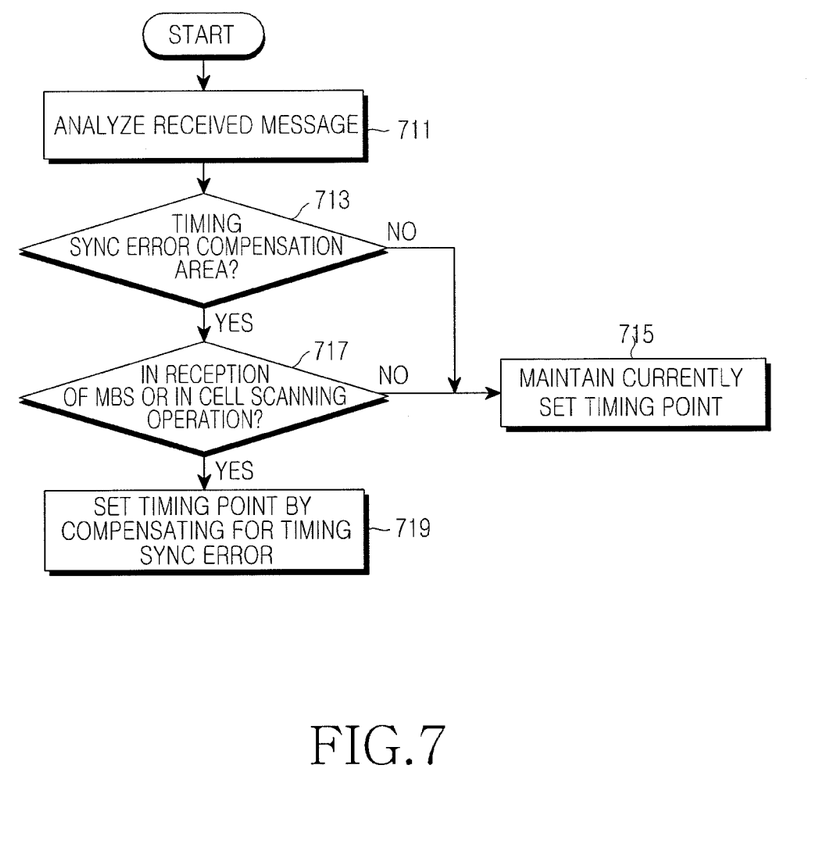
FIG. 7 is a flowchart showing a process of compensating for a timing synchronization error by a UE when a BS uses a first notification scheme in an indoor picocell communication system according to an exemplary embodiment of the present invention.

FIG. 7 shows a process of compensating for a timing synchronization error by a UE when a BS uses a first notification scheme in an indoor picocell communication system according to an exemplary embodiment of the present invention.

Referring to FIG. 7, the UE analyzes a received MAC message or application message in step 711. The UE determines in step 713 whether a service area of a BS, in which the UE exists, is a timing synchronization error compensation area. If not, the UE maintains the currently set timing point in step 715.

On the other hand, if it is determined in step 713 that a service area of a BS, in which the UE exists, is a timing synchronization error compensation area, the UE determines in step 717 whether the UE is presently receiving MBS or performing a cell scanning operation. If not, the UE proceeds to step 715. On the other hand, if it is determined in step 717 that the UE is presently receiving MBS or performing a cell scanning operation, the UE sets a new timing point by compensating for the timing synchronization error in step 719.

Next, reference will be made to FIG. 8 to describe a process of compensating for a timing synchronization error by a UE when a BS uses a second notification scheme in an indoor picocell communication system according to an exemplary embodiment of the present invention.

Figure 8:
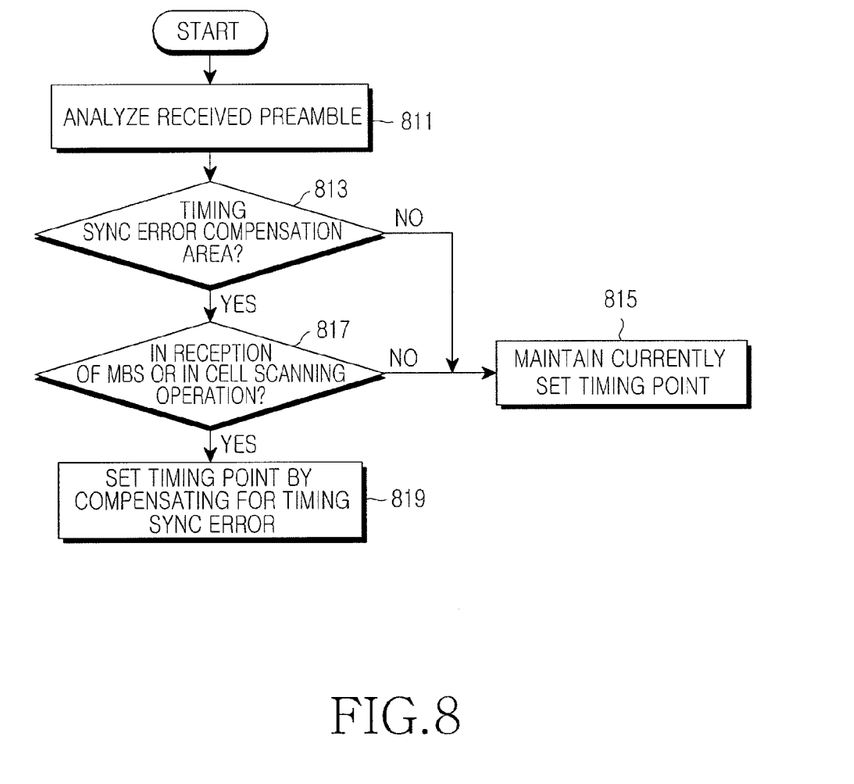
FIG. 8 is a flowchart showing a process of compensating for a timing synchronization error by a UE when a BS uses a second notification scheme in an indoor picocell communication system according to an exemplary embodiment of the present invention.

FIG. 8 shows a process of compensating for a timing synchronization error by a UE when a BS uses a second notification scheme in an indoor picocell communication system according to an exemplary embodiment of the present invention.

Referring to FIG. 8, the UE analyzes a received preamble in step 811. The UE determines in step 813 whether a service area of a BS, in which the UE exists, is a timing synchronization error compensation area. If not, the UE maintains the currently set timing point in step 815.

On the other hand, if it is determined in step 813 that a service area of a BS, in which the UE exists, is a timing synchronization error compensation area, the UE determines in step 817 whether the UE is presently receiving MBS or performing a cell scanning operation. If not, the UE proceeds to step 815. On the other hand, if it is determined in step 817 that the UE is presently receiving MBS or performing a cell scanning operation, the UE sets a new timing point by compensating for the timing synchronization error in step 819.

Next, reference will be made to FIG. 9 to describe a process of compensating for a timing synchronization error by a UE when a BS uses a third notification scheme in an indoor picocell communication system according to an exemplary embodiment of the present invention.

Figure 9:
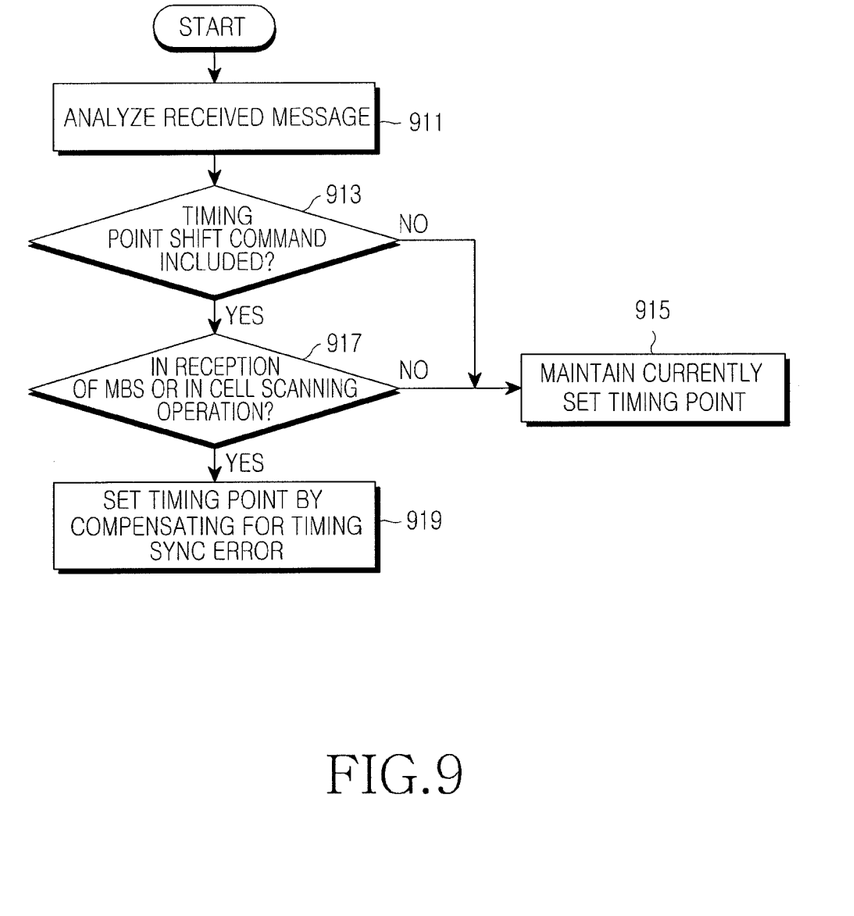
FIG. 9 is a flowchart showing a process of compensating for a timing synchronization error by a UE when a BS uses a third notification scheme in an indoor picocell communication system according to an exemplary embodiment of the present invention.

FIG. 9 shows a process of compensating for a timing synchronization error by a UE when a BS uses a third notification scheme in an indoor picocell communication system according to an exemplary embodiment of the present invention.

Referring to FIG. 9, the UE analyzes a received MAC message or application message in step 911. The UE determines in step 913 whether a timing point shift command is included in the received message. If not, the UE maintains the currently set timing point in step 915.

On the other hand, if it is determined in step 913 that a timing point shift command is included in the received message, the UE determines in step 917 whether the UE is presently receiving MBS or performing a cell scanning operation. If not, the UE proceeds to step 915. On the other hand, if it is determined in step 917 that the UE is presently receiving MBS or performing a cell scanning operation, the UE sets a new timing point by compensating for the timing synchronization error in step 919.

As is apparent from the foregoing description, in a communication system according to exemplary embodiments of the present invention, a BS notifies of the need for timing synchronization error compensation of a UE, and the UE compensates for a timing synchronization error in response to the notification, thereby improving cell scanning performance of the UE and improving timing synchronization setting and channel estimation performances of the UE during MBS provision.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for performing a timing synchronization error compensation by a base station (BS) in an indoor communication system, the method comprising:
   generating a message including information related to the timing synchronization error compensation when there is a need for the timing synchronization error compensation of a user equipment (UE); and
   broadcasting the generated message to the UE,
   wherein the UE is located in a service area of the indoor communication system,
   wherein the information related to the timing synchronization error compensation indicates that a service area of the BS is an area needing a timing synchronization error compensation of the UE, and
   wherein, when the indoor communication system uses a cyclic prefix (CP), the timing synchronization error compensation is performed considering a length of the CP and a maximum excess delay spread of a channel.

2. A base station (BS) in an indoor communication system in which a user equipment (UE) performs a timing synchronization error compensation, the BS comprising:
   a controller configured to generate a message including information related to the timing synchronization error compensation when there is a need for the timing synchronization error compensation of the UE; and
   a transmitter configured to broadcast the generated message to the UE,
   wherein the UE is located in a service area of the indoor communication system,
   wherein the information related to the timing synchronization error compensation indicates that a service area of the BS is an area needing a timing synchronization error compensation of the UE, and
   wherein, when the indoor communication system uses a Cyclic Prefix (CP), the timing synchronization error compensation is performed considering a length of the CP and a maximum excess delay spread of a channel in the indoor communication system.

3. The BS of claim 2, wherein the indoor communication system does not set timing synchronization using a Global Positioning System (GPS).

4. A method for performing a timing synchronization error compensation by a user equipment (UE) in an indoor communication system, the method comprising:
   receiving a message including information related to the timing synchronization error compensation, broadcasted from a base station (BS); and
   performing the timing synchronization error compensation according to the received message,
   wherein the UE is located in a service area of the indoor communication system,
   wherein the information related to the timing synchronization error compensation indicates that a service area of the BS is an area needing a timing synchronization error compensation of the UE, and
   wherein, when the indoor communication system uses a Cyclic Prefix (CP), the timing synchronization error compensation is performed considering a length of the CP and a maximum excess delay spread of a channel in the indoor communication system.

5. The method of claim 4, wherein the performing of the timing synchronization error compensation comprises setting a timing point by advancing a currently set timing point by a timing synchronization error compensation value.

6. A user equipment (UE) for performing a timing synchronization error compensation in an indoor communication system, the UE comprising:
   a receiver configured to receive a message including information related to the timing synchronization error compensation, broadcasted from a base station (BS); and
   a controller configured to perform the timing synchronization error compensation according to the received message,
   wherein the UE is located in a service area of the indoor communication system,
   wherein the information related to the timing synchronization error compensation indicates that a service area of the BS is an area needing a timing synchronization error compensation of the UE, and
   wherein, when the indoor communication system uses a cyclic prefix (CP), the controller performs the timing synchronization error compensation considering a length of the CP and a maximum excess delay spread of a channel in the indoor communication system.

7. The UE of claim 6, wherein the indoor communication system does not set timing synchronization using a Global Positioning System (GPS).

8. The UE of claim 6, wherein the controller performs the timing synchronization error compensation by setting a timing point by advancing a currently set timing point by a timing synchronization error compensation value.

9. A method for performing a timing synchronization error compensation by a user equipment (UE) in a communication system, the method comprising:
   receiving from a base station (BS) a message indicating that a service area of the BS is a timing synchronization error compensation area where the timing synchronization error compensation of the UE is needed;
   determining whether the UE is presently receiving a Multicast and Broadcast Service (MBS) or performing a cell scanning operation;
   determining that the timing synchronization error compensation is needed, if when the UE is presently receiving an MBS from the BS or performing a cell scanning operation; and performing the timing synchronization error compensation when the timing synchronization error compensation is needed, wherein, when the indoor communication system uses a cyclic prefix (CP), the timing synchronization error compensation is performed considering a length of the CP and a maximum excess delay spread of a channel.

10. A method for performing a timing synchronization error compensation by a user equipment (UE) in a communication system, the method comprising:

receiving a message including a timing point shift command from a base station (BS);

determining whether the UE is presently receiving a multicast and broadcast service (MBS) or performing a cell scanning operation;

determining that the timing synchronization error compensation is needed, if when the UE is presently receiving an MBS from the BS or performing a cell scanning operation; and performing the timing synchronization error compensation upon recognizing the need for timing synchronization error compensation, wherein, when the indoor communication system uses a cyclic prefix (CP), the timing synchronization error compensation is performed considering a length of the CP and a maximum excess delay spread of a channel.

11. The method of claim 1, wherein the indoor communication system does not set timing synchronization using a Global Positioning System (GPS).

12. The method of claim 4, wherein the indoor communication system does not set timing synchronization using a Global Positioning System (GPS).

13. The method of claim 1,
wherein the timing synchronization error compensation is preformed based on a timing synchronization error compensation value, and
wherein the timing synchronization error compensation value is determined by subtracting the maximum excess delay spread of the channel in the indoor communication system from the length of the CP.

14. The BS of claim 2,
wherein the timing synchronization error compensation is preformed based on a timing synchronization error compensation value, and
wherein the timing synchronization error compensation value is determined by subtracting the maximum excess delay spread of the channel in the indoor communication system from the length of the CP.

15. The method of claim 4,
wherein the timing synchronization error compensation is preformed based on a timing synchronization error compensation value, and
wherein the timing synchronization error compensation value is determined by subtracting the maximum excess delay spread of the channel in the indoor communication system from the length of the CP.

16. The UE of claim 6,
wherein the timing synchronization error compensation is preformed based on a timing synchronization error compensation value, and
wherein the timing synchronization error compensation value is determined by subtracting the maximum excess delay spread of the channel in the indoor communication system from the length of the CP.

17. The method of claim 9,
wherein the timing synchronization error compensation is performed based on a timing synchronization error compensation value, and
wherein the timing synchronization error compensation value is determined by subtracting the maximum excess delay spread of the channel in the indoor communication system from the length of the CP.

18. The method of claim 10,
wherein the timing synchronization error compensation is performed based on a timing synchronization error compensation value, and
wherein the timing synchronization error compensation value is determined by subtracting the maximum excess delay spread of the channel in the indoor communication system from the length of the CP.

* * * * *